United States Patent
Lotz et al.

(10) Patent No.: US 9,534,659 B2
(45) Date of Patent: Jan. 3, 2017

(54) V-RIBBED BELT AND METHOD FOR PRODUCING SAME

(71) Applicant: Arntz Beteiligungs GmbH & Co., Hoexter (DE)

(72) Inventors: Florian Lotz, Brevoerde (DE); Dennis Kopmann, Garbsen (DE)

(73) Assignee: ARNTZ BETEILIGUNGS GMBH & CO, KG, Hoexter (DE)

( * ) Notice: Subject to any disclaimer, the term of this patent is extended or adjusted under 35 U.S.C. 154(b) by 305 days.

(21) Appl. No.: 14/349,997

(22) PCT Filed: Oct. 4, 2012

(86) PCT No.: PCT/EP2012/004143
§ 371 (c)(1),
(2) Date: Aug. 5, 2014

(87) PCT Pub. No.: WO2013/050142
PCT Pub. Date: Apr. 11, 2013

(65) Prior Publication Data
US 2014/0364261 A1    Dec. 11, 2014

(30) Foreign Application Priority Data

Oct. 6, 2011    (DE) .................. 10 2011 114 918

(51) Int. Cl.
*F16G 5/04*    (2006.01)
*F16G 1/22*    (2006.01)
(Continued)

(52) U.S. Cl.
CPC . *F16G 5/04* (2013.01); *F16G 1/22* (2013.01); *F16G 5/06* (2013.01); *F16G 5/20* (2013.01);
(Continued)

(58) Field of Classification Search
CPC ................ F16G 1/00; F16G 1/06; F16G 1/08; F16G 1/22; F16G 1/28; F16G 5/04; F16G 5/06; F16G 5/16; F16G 5/20
See application file for complete search history.

(56) References Cited

U.S. PATENT DOCUMENTS 4,758,213 A * 7/1988 Tanaka ...................... F16G 1/00
                                                       474/264
4,895,555 A * 1/1990 Watanabe ......... B29C 45/14631
                                                       474/260

(Continued)

FOREIGN PATENT DOCUMENTS

DE          69404547 T2    3/1998
DE       102006007509 A1    8/2007
(Continued)

*Primary Examiner* — Minh Truong
(74) *Attorney, Agent, or Firm* — Whitham, Curtis & Cook, P.C.

(57) ABSTRACT

A v-ribbed belt manufactured in a molding or grinding process has in different areas of the structure thereof different elastomer materials. In upper rib segments oriented toward the belt pulley there is an elastomer material that is not electrically conductive. The lower rib segments are made of an electrically conductive elastomer material. The height ratio a/(a+b) of the height (a) of the lower rib segments to the overall height (a+b) of the rib, as measured at the material boundary located at the rib flank, is at least 6 percent, or the absolute height of the lower rib segments is at least 0.12 mm.

8 Claims, 1 Drawing Sheet

(51) Int. Cl.
*F16G 5/20* (2006.01)
*F16G 5/06* (2006.01)
*B29K 23/00* (2006.01)
*B29K 105/16* (2006.01)
*B29K 507/04* (2006.01)
*B29L 29/00* (2006.01)

(52) U.S. Cl.
CPC ........ *B29K 2023/16* (2013.01); *B29K 2105/16* (2013.01); *B29K 2507/04* (2013.01); *B29K 2995/0005* (2013.01); *B29L 2029/00* (2013.01)

(56) References Cited

U.S. PATENT DOCUMENTS

| | | | | |
|---|---|---|---|---|
| 5,536,214 A * | 7/1996 | Akita | .................. | F16G 1/28 474/268 |
| 6,770,004 B1 * | 8/2004 | Lofgren | .................... | F16G 1/00 474/264 |
| 8,192,316 B2 * | 6/2012 | Marc | ...................... | B65G 15/34 442/229 |
| 8,197,372 B2 * | 6/2012 | Wu | .......................... | F16G 1/28 474/260 |
| 2008/0132370 A1 * | 6/2008 | Goettsch | .................. | F16G 5/20 474/268 |
| 2009/0291796 A1 | 11/2009 | Mitsutomi et al. | | |

FOREIGN PATENT DOCUMENTS

| | | |
|---|---|---|
| DE | 112006002164 T5 | 6/2008 |
| DE | 102007042917 A1 | 3/2009 |
| DE | 102009003798 A1 | 10/2010 |
| EP | 0198308 A1 | 10/1986 |
| EP | 2128486 A2 | 12/2009 |
| EP | 2175163 A1 | 4/2010 |
| WO | 2009016797 A1 | 2/2009 |

* cited by examiner

V-RIBBED BELT AND METHOD FOR PRODUCING SAME

FIELD OF THE INVENTION

The invention relates to V-ribbed belts, "poly-V-belts" or "ripped bands", occasionally also designated a ribbed band, and methods for producing same.

BACKGROUND

V-ribbed belts are used in various technical areas, in particular as endless transmission belts. They are distinguished by the fact that, on its side facing the belt pulley, the belt has a plurality of ribs running longitudinally, which interact with a multi-grooved belt pulley. The number of ribs is greater than or equal to 2 and is generally between 3 and 10 V ribs. The force between belt pulley and belt is introduced via the rib flanks.

There are industrially standardized rib profiles. Here, the profiles PH, PJ, PK, PL, PM have overall belt heights between 2 and 15.0 mm with rib spacings between 1.6 and 9.4 mm. The rib heights are approximately between 1 and 9 mm.

In general, the ribbed belts have the structure usual for transmission belts, comprising the following zones:
1. the back of the belt or the expansion zone facing away from the belt pulley;
2. a load-bearing zone having tension carriers running, for example wound, in the circumferential direction, made of cables, cords or strips;
3. a substructure or a compression zone directed toward the belt pulley, on which the ribs for the engagement in the grooves of the belt pulley are formed.

Here, the entire belt body and in particular the substructure is composed of at least one high-performance elastomer, traditionally a rubber elastomer.

In order to improve the mechanical properties and the running performance of the belts, novel elastomer materials, which are frequently electrically non-conductive, are increasingly used nowadays. Electrostatic charging of the belt therefore occurs during running.

While a V-belt normally runs sunk in the individual groove of the associated belt pulley and thus has complete contact with the belt pulley at the sides, this is not the case in a V-ribbed belt, since the belt pulley engages in the interspaces between the ribs only frontally, so that the belt rests on the circumference of the belt pulley. The back of the belt and the tension carrier layer have no contact with the belt pulley in this case; the contact is produced exclusively via the rib flanks.

In the case of ribbed belts, it is therefore not possible to effect the dissipation of electrostatic charges via a conductive textile layer on the back of the belt. In addition, the complete sheathing of the ribbed belt with a conductive textile material is not feasible or reduces the belt quality considerably, because of the acute-angled valleys between the steep rib flanks. Complete coating or sheathing of the ribs additionally destroys the mechanical action of the high-performance elastomer lying underneath during the introduction of force.

WO 2009/16797 A1 discloses a ribbed belt, of which the ribbed elastomer contains short fibers and large-grained carbon distributed in point form. However, fibers and relatively large particles made of foreign materials have a detrimental influence on the mechanical-dynamic properties of the elastomer of the force transmission zone, so that this method cannot be the method of choice.

SUMMARY

The invention is therefore based on the object of forming a ribbed belt, the ribs of which use a non-conductive elastomer where they come into direct contact with the belt pulley such that electrostatic charges can be dissipated effectively from the belt.

In a ribbed belt having a plurality of ribs for the engagement of a multi-grooved belt pulley, the belt having at least two different elastomer materials, the object is achieved in that the upper rib segments, pointing toward the belt pulley, consist of an elastomer material that is substantially electrically non-conductive, the lower rib segments consist of an electrically conductive elastomer material, and the height ratio a/(a+b) of the height a of the lower rib segments to the overall height a+b of the rib, measured at the material boundary occurring at the rib flank, is at least 6%, or the absolute height a of the lower rib segments is at least 0.12 mm.

The nub of the invention consists in forming the ribs of the ribbed belt in a coherent upper rib region or segment, comprising the rib tips, from a substantially non-conductive elastomer material and, in an adjacent coherent lower rib region or segment, which extends at least as far as the foot point of the rib or the rib valley, from a conductive elastomer material, which is suitable to dissipative electrostatic charges via the belt pulley.

The remaining belt body, in particular the back and the cord inlay, can consist of one of the rib materials or another material known for these layers or parts of the structure.

Surprisingly, it has been found that the absolute height of the lower rib segment can be relatively small. This results in a number of advantages.

The belt can be made economically in a simple way. For this purpose, a basic belt is built up in several layers in a manner known per se and is then processed further, either by using a molding or embossing method or a grinding method, to form the ribbed belt.

The ribs are open at the flank, so that the belt pulley in the upper rib segment can come into contact over a relatively large continuous flank region with a non-conductive elastomer chosen, for example, because of its mechanical properties.

The conductive elastomer of the lower rib segment can be a conventional and economically obtainable elastomer filled with conductive carbon black. Nevertheless, there is comparatively little black abrasion. The different material of the lower rib segment is visually inconsequential.

The conflict of goals between good mechanical properties and adequate, permanent conductivity in the same material no longer occurs.

Even in the case of a lower height of the upper rib segment, it is possible to combine extensively improved mechanical properties with a desired appearance; elastomers not filled with carbon black can generally be dyed, which, for example, can be used for different-colored identification of different belt types. Because of the special structure of a ribbed belt, in the view from the belt substructure it is primarily the rib tips which are striking, so that a color coding can be detected easily.

A further central advantage of the novel V-ribbed belt results from the fact that the loss of mass as a result of abrasion on the rib flanks over the running time of the belt leads to the belt pulley running more deeply in the belt cross section. As a consequence, the contact of the belt pulley with the conductive material of the lower rib segment becomes better with the running time, while a surface coating would be removed over time, so that such a belt could develop dangerous electric charges at a time that could not be determined more precisely.

In the case of the non-conductive elastomer material of the upper rib segment, no regard has to be paid to the material property "conductivity", so that the material can be optimized completely to other properties, for example to the coefficient of friction, low noise, low abrasion, color, feel or any other desired properties.

$a=0.12$ mm is viewed as a minimum absolute value for the height "a" at which the contact of the belt pulley is always ensured even in the case of narrow rib conformations.

The minimum absolute height of the lower rib segment from the material boundary to the non-conductive material of the upper rib segment as far as the rib foot or rib valley preferably relates to profiles having a belt height between 2.0 and 30 mm and a rib spacing between 1 mm and 16 mm with rib heights of 1.8 to 20 mm, in particular to the standard profiles PH, PJ, PK, PL and PM (rib spacing 1.6 mm to 9.4 mm therebetween). For larger or smaller profiles, the geometry must be tested specially, and the absolute height of the lower rib segments must be adjusted to the engagement depth of the belt pulleys and test in practice.

In a preferred embodiment, the lower rib segments are formed coherently, i.e. the lower rib segments and an adjacent zone, which comprises the rib valleys and extends over the entire width of the belt, consist entirely of the conductive elastomer material of the lower rib segments. This firstly ensures complete contact of the belt pulley circumferential edges with conductive material and likewise effects an immediate better distribution of the electrostatic charges that build up to the various dissipation zones of a multi-grooved pulley.

The conductive zone that is continuous over the belt width makes it possible to keep the absolute height of the lower rib segments and therefore the contact zone on the rib flanks in the area of the rib valleys particularly small and nevertheless always to ensure the conductivity, even for an extremely wide range of transmission geometries. In general, the conductivity is ensured for every geometry that is established during the running time of the belt. Abrasion or cutting-in leads to enlargement of the height of the lower belt segment and therefore is more likely to improve contact of this region with the belt pulley.

If, in the structure, the rib material is adjoined by a different elastomer material, which is possibly less conductive and, for example, can be used to embed the tension carriers, the absolute height of the lower, conductive rib segments is preferably chosen to be somewhat larger than the minimum value. Even in the case of relatively long running times and cutting into this other material, the dissipation of charges via the flanks of the ribs is always ensured.

According to the invention, the height ratio of the lower rib segments to the overall height of the rib, measured at the material boundary occurring at the rib flank, is at least 6%, preferably at least 10% and particularly preferably at least 14%.

According to the invention, the absolute height of the lower rib segments is at least 0.12 mm and preferably at least 0.2 mm, particularly preferably at least 0.25 mm.

In particularly preferred embodiments, the elastomer material of the two rib segments—upper rib segment, which comprises the rib tips, and lower rib segment as far as the rib foot or rib valley—consists of the same basic elastomer, preferably a rubber elastomer or resilient polyurethane. The same basic elastomer is understood to mean a chemically identical or identical type of elastomer with respect to the cross-linked polymer basic material, irrespective of possible different additives, fillers and functional additives such as cross-linkers, chain extenders and chemical polymer modifications. The same basic elastomer can be, for example, a natural or synthetic rubber elastomer, such as natural rubber or synthetic rubber, including ethylene alpha olefin elastomers or SBR rubbers; particular preference is given to an EPDM elastomer. Elastomeric polyurethanes, for example, are likewise suitable. The non-conductive material of the upper rib segment, just like the conductive material of the lower rib segment and, if appropriate, the adjacent zone, is then preferably based on a polyurethane in both cases, which can be filled differently, and in which the conductive variant is preferably filled with a certain proportion of conductive carbon black.

In general, it is preferred for the conductive elastomer material of the lower rib segments to be an elastomer material filled with carbon black, since this represents a material that has proven worthwhile over many years and is easily available. Other conductive elastomers are not ruled out for the purposes of the invention.

Furthermore, it is preferred for the non-conductive elastomer material of the upper rib segments to be a white-filled, preferably a silica-filled, elastomer material. Fillers of this type are known to those skilled in the art. These are preferably surface-modified or non-surface-modified silicic acid or other inorganic oxidic materials such as aluminum oxides, aluminosilicates, zinc oxides, titanium oxides, barium sulfate, kaolin and the like.

In a development of the invention, the height ratio of the lower rib segments to the rib height should be less than or equal to 95%, preferably less than or equal to 70% and, further preferably, less than or equal to 50%. In particularly preferred embodiments, the height ratio of the lower rib segments to the upper rib segments is less than or equal to 20%, in particular less than or equal to 15%, if the material of the upper rib segments has been chosen on the basis of its mechanical properties and a largest possible contact area is to be provided by means of the rib flanks of the upper rib segments. In this way, the non-conductive high-performance elastomer of the upper rib segments can be used particularly efficiently for the introduction of force to or from the ribbed pulley. By contrast, if only color coding is to be performed, the height ratio of the lower rib segments to the overall rib height or the upper segments can turn out to be larger.

As already mentioned above, the V-ribbed belts can be produced by the conventional production methods, firstly the materials for the lower rib segments and the upper rib segments being layered over one another before being shaped or cut in the usual way. If a grinding method is applied, the material boundary between the elastomer of the upper rib segments and the elastomer of the lower rib segments is formed substantially flat and parallel to the rear of the rib. If, on the other hand, a molding method is used, the viscosities of the various mixtures under vulcanization and embossing conditions play a critical role, since in this way the shaping of the deviation from the parallel course can be adjusted. As a result of the embossing, the non-conductive material of the upper rib segments is forced further downward in the direction of the rib valleys at the flanks, so that the material boundary between conductive and non-conductive elastomer in the rib cross section will show a form curved toward the rib tip.

A ribbed belt according to the invention produced in the molding method is therefore to be detected, amongst other things, in that the rib cross section exhibits a boundary layer between the upper and lower rib segment that is curved toward the rib tip. The extent of the curvature depends on the properties of the unvulcanized elastomer mixtures and the processing properties of these elastomers.

If the conductive mixture is chosen to be highly viscous and the non-conductive mixture is chosen to have a low viscosity, a detrimental displacement of the height ratios during the embossing method can largely be avoided. The course of the boundary layer corresponds substantially to that of the grinding method. If, on the other hand, the conductive mixture is chosen to have a low viscosity and the non-conductive mixture is chosen to be highly viscous, the lower-viscosity layer will experience high deformation during the embossing method, so that the height ratio of the flank segments is detrimentally changed. In the extreme case, the non-conductive layer surrounds the conductive layer in the rib region completely and it would not be possible to produce any contact between the conductive material and a meshing belt pulley.

In a development of the invention, provision is therefore made that, when a molding method is used, the layer provided for the shaping of the upper rib segments is formed from a non-conductive elastomer which, in the unvulcanized state, has a lower viscosity than the conductive elastomer used for the lower rib segments.

In the following text, the invention will be explained in more detail by using exemplary embodiments, which are illustrated in the appended drawing.

BRIEF DESCRIPTION OF THE FIGURES

FIG. 1 shows a V-ribbed belt, designated as a whole by 10, having the belt height h and the rib spacing s, which has three ribs 1, and, below it, part of an associated multi-groove belt pulley 4 having the individual grooves 5 in a schematic illustration. The belt has multiple tension carriers 2, which are arranged close to the back 3 of the rib. When the ribs 1 of the ribbed belt 10 engage in the grooves 5 of the belt pulley 4, the two interact and the flanks 6 of the ribs 1 come into contact with the flanks 7 of the grooves 5. Each rib 1 of the ribbed belt has an upper rib segment 8, which comprises the rib tips 18, and a lower rib segment 9, which extends as far as the height of the rib valleys 19 at the foot of the rib. In the present exemplary embodiment, the lower rib segments 9, together with an adjacent zone 11 which surrounds the rib valleys 19, form a continuous area extending over the entire width of the belt, which consists entirely of the conductive elastomer material of the lower rib segments 9. The V-ribbed belt according to FIG. 1 is an embossed ribbed belt, in which the material boundary 12 between the conductive elastomer of the lower rib segments 9 and the non-conductive elastomer of the upper rib segments 8 is curved slightly in the direction of the rib tips 18. The height a of the lower rib segments 9 is determined by the height between the rib valley and the material boundary 12 at the rib flank 6. The height of the upper rib segments 8 is determined by the difference in height between the material boundary 12 at the rib flank 6 and the height of the rib tip 18. As a result of the special embossing method of the invention, the material boundary 12 is curved only slightly, so that the conductive material of the lower rib segments is exposed over an adequate area of the rib flank 6.

By contrast, FIG. 2 shows a corresponding but five-rib ribbed belt 10 having a flat material boundary 12, which has been produced using a grinding method.

Figure 2:
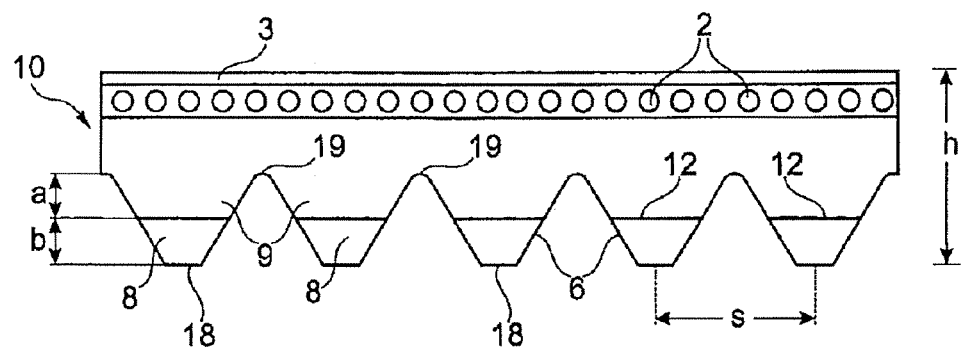
FIG. 2 is a five-rib ribbed belt in a schematic cross-sectional illustration, produced using a grinding method.
Figure 1:
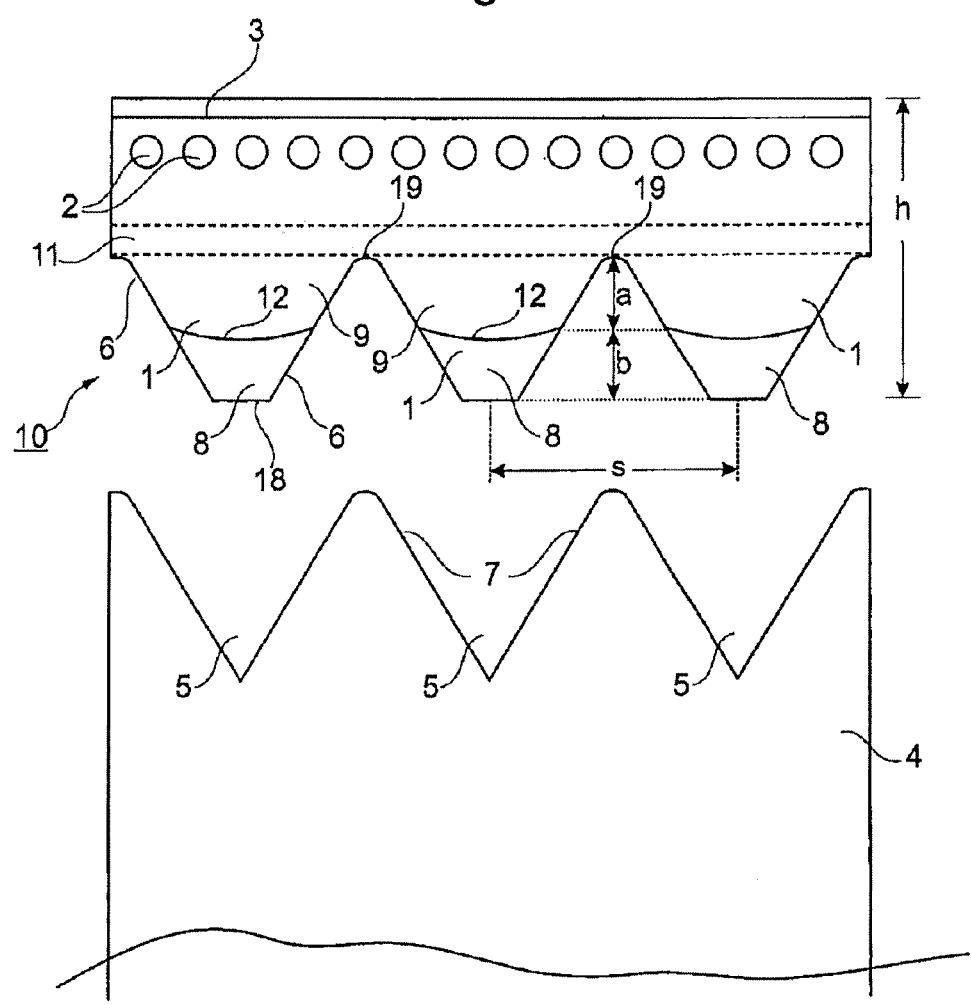
FIG. 1 is a three-rib ribbed belt in a schematic cross-sectional illustration, produced using an embossing method.

The optimal height ratios a/(a+b) for this test configuration were determined experimentally. The test results are reproduced below. A minimal absolute value of at least 0.12 mm for the height of the lower rib segments "a" always resulted in an adequate conductivity/voltage derivative.

Conductivity Test

Ribbed belts with the PK profile, the belt bodies of which consisted of an EPDM, were investigated. The conductive rib mixture A contained highly conductive carbon black in a weight proportion between 10 and 25 per cent by weight and further smaller proportions of less-conductive carbon blacks. The non-conductive rib mixture B contained no carbon black, instead fillers based on silicic acid.

Test Arrangement

For the test arrangement, two belt pulleys (PK profile, external diameter equal to 50.00 mm) were mounted with a spacing of 10 cm from each other (mean spacing) on a non-electrically conductive plate such that a V-ribbed belt laid in the two belt pulleys was pressed into the belt pulleys by a pulling mass of 10 kg. For this purpose, the belt was fixed at one end and weighted at its other end with a weight of 10 kg. The contact between the two outer ribs of the belt and the associated profile of the belt pulley was insulated in order to ensure that, for this investigation, the contact between belt pulley and belt was produced only in the inner rib area. The conductivity from belt pulley to belt pulley was measured at a voltage of 500 V.

The test results are shown in table 1:

TABLE 1

Test results, exemplary profile PK

| Sample | Conductivity in % | Overall structure height/belt height (mm) | a/(a + b) |
|---|---|---|---|
| 1 | 100 | 5.090 | 0.084 |
| 2 | 100 | 5.070 | 0.122 |
| 3 | 100 | 5.040 | 0.100 |
| 4 | 100 | 5.060 | 0.117 |
| 5 | 100 | 5.040 | 0.122 |
| 6 | 100 | 5.020 | 0.071 |
| 7 | 100 | 5.040 | 0.122 |
| 8 | 100 | 5.060 | 0.060 |
| Average | | | 0.10 |

Conductivity is established approximately with an [a/(a + b)] ratio of 0.06 to 0.13. The minimum height a for the serviceable examples was from 0.12 mm.

LIST OF DESIGNATIONS

1 Rib
2 Tension carrier
3 Back of the belt
4 Belt pulley
5 Belt pulley groove
6 Rib flank
7 Groove flank 8 Upper rib segment
9 Lower rib segment
10 V-ribbed belt
11 Zone
12 Material boundary
18 Rib tip
19 Rib valley
a Height of the lower rib segment
b Height of the upper rib segment
a+b Overall rib height
h Belt height
s Rib spacing

The invention claimed is:

1. A V-ribbed belt, comprising:
a plurality of ribs configured for engagement of a multi-grooved belt pulley at rib flanks on opposite sides of each rib, wherein each rib of the plurality of ribs has an upper rib segment formed from a non-conductive elastomer material and a lower rib segment formed from a conductive elastomer material, wherein a material boundary between the non-conductive elastomer and the conductive elastomer in each rib extends to the rib flanks, wherein the lower rib segments of the plurality of ribs have a height dimension measured from a bottom of a valley between each two adjacent ribs of the plurality of ribs to the material boundary between the lower rib segment and the upper rib segment at the rib flanks of the two adjacent ribs is at least 0.12mm, and wherein each rib has a tip and wherein a height ratio of the height dimension of the lower rib segments to a second height dimension measured from the valley between the two adjacent ribs to a plane connecting tips of the two adjacent ribs is at least 6% wherein elastomer material in the non-conductive elastomer material and the conductive elastomer material is the same, and filler in the non-conductive elastomer material and the conductive elastomer material is different, wherein the filler in the conductive elastomer material includes carbon black, and wherein the filler in the non-conductive elastomer material includes silica.

2. The V-ribbed belt as claimed in claim 1, further comprising an adjacent zone which surrounds and extends below the valleys and extends over an entire width of the V-ribbed belt and which is formed from the conductive elastomer material of the lower rib segments.

3. The V-ribbed belt as claimed in claim 1, wherein the material boundary between the upper rib segment and the lower rib segment is curved toward the tip between the rib flanks on opposite sides of the rib.

4. The V-ribbed belt as claimed in claim 1, wherein the material boundary between the upper rib segment and the lower rib segment is flat between the rib flanks on opposite sides of the rib.

5. A method for producing a V-ribbed belt as claimed in claim 1, wherein either
the V-ribbed belt is produced in a molding method using a vulcanization mold, and a layer used for shaping the upper rib segments is formed from the non-conductive elastomer which is less viscous than the conductive elastomer used for the lower rib segments; or
the V-ribbed belt is produced in a grinding method wherein elastomer material for the upper rib segments and lower rib segments are applied over one another in layers, and the ribs are formed by grinding.

6. The method claimed in claim 5 wherein the V-ribbed belt is produced in the grinding method.

7. The method of claim 5 wherein the V-ribbed belt is produced in the molding method.

8. The V-ribbed belt as claimed in claim 1 wherein the elastomer material is selected from the group comprising of rubbers and polyurethanes.

* * * * *